A. L. JOHNSON.
TOOTHED ROLLER FOR EARTHWORKING TOOLS.
APPLICATION FILED SEPT. 24, 1918.

1,288,608.

Patented Dec. 24, 1918.

INVENTOR:
Alfred L. Johnson
BY his ATTORNEY:
A. M. Carlsen

ALFRED L. JOHNSON, OF BOARDMAN, WISCONSIN.

TOOTHED ROLLER FOR EARTHWORKING-TOOLS.

1,288,608.

Specification of Letters Patent. Patented Dec. 24, 1918.

Application filed September 24, 1918. Serial No. 255,415.

*To all whom it may concern:*

Be it known that I, ALFRED L. JOHNSON, a citizen of the United States, residing at Boardman, in the county of St. Croix and State of Wisconsin, have invented a new and useful Toothed Roller for Earthworking-Tools, of which the following is a specification.

This invention relates to toothed rollers for harrows and quack-grass destroyers or other rotary earth-working tools or machines.

The main object of the invention is to provide said class of machines with rollers having teeth firmly but detachably secured to the roller. Another object is to provide harrow teeth which may be secured to the rollers without weakening the latter.

Figure 1:
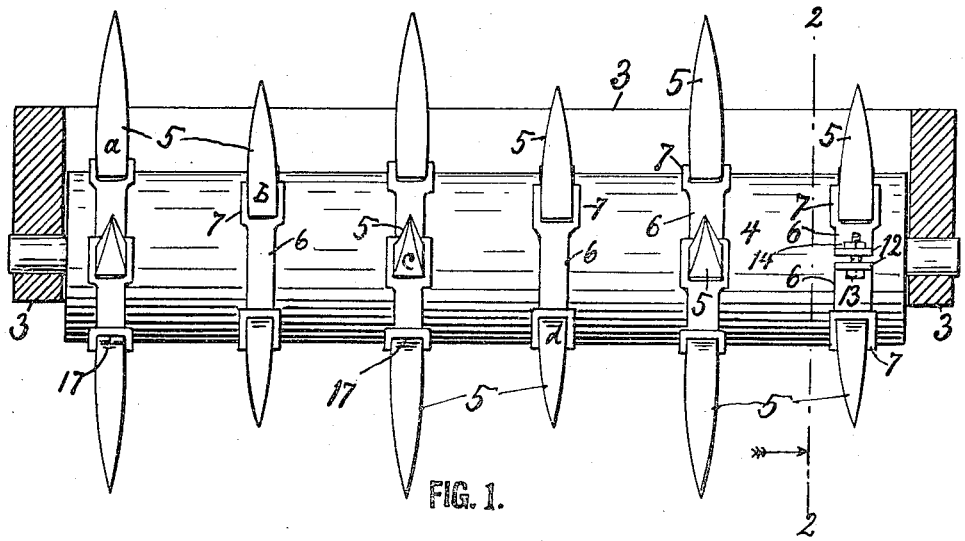
Figure 2:
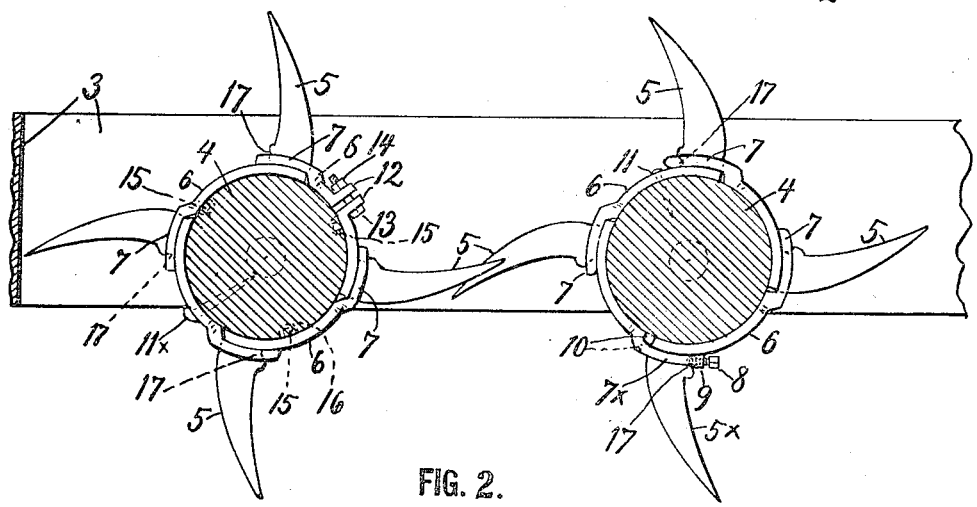

These and other objects I attain by the novel construction and arrangement of parts illustrated in the accompanying drawings, in which:

Figure 1 is a cross section of a harrow frame showing one of my improved toothed rollers journaled therein. Fig. 2 is a section through such a harrow about as on the line 2—2 in Fig. 1.

Referring to the drawing by reference numerals, 3 designates the frame of a harrow or other rotary earth working tool or machine. In said frame are journaled the ends of any desired number of parallel rollers, 4, each of which is provided with teeth 5, which are preferably curved some, and the rollers are placed so close together that the teeth of each roller overlap about one-third of their length in between the teeth of the next roller, as shown at the middle of Fig. 2. This arrangement is to enable the teeth to more thoroughly break up and pulverize the soil.

The rollers may be made of either wood or iron and may be either solid or hollow. In the present drawing they are shown as being solid and probably made of wood. The teeth are secured in a peculiar manner, in that each tooth is formed with a segment 6 having an eye 7 which embraces the inner end of the next tooth of a series of such segments until the series forms a ring about the roller. Said rings are suitably spaced apart along the roller and in peripheric direction they are so turned that the teeth form a kind of spirals, as indicated by the teeth marked $a$, $b$, $c$, and $d$ in Fig. 1; and as a rule each ring on one roller has its teeth arranged to swing about midway between the teeth of two rings on the next roller or rollers.

To tighten each band around the roller I use a tightening screw like 8 shown to the right in Fig. 2, which screw is threaded in the part 9 of the eye $7^x$ and presses with its point against the front edge of the tooth $5^x$; said eye $7^x$ having a clearance 10 for the tooth $5^x$ to move in, the screw draws the entire ring very tight about the roller, yet, for further safety, a spike 11 may be driven through an aperture in one of the segments 6 into the roller, preferably at a point diametrically opposite from the screw 8, so that the latter will have no tendency to move the ring at the point where the spike is located.

To the left in Fig. 2 and far to the right in Fig. 1 is shown a modified arrangement of the tightening screw. In said modified form one of the segments 6 in each ring is divided at the middle and formed with spaced lugs 12, through which is inserted a screw 13, which may be threaded into one of the lugs and provided with a jam nut 14, or the nut alone may suffice without any threads in the lug. It is evident that by means of said screw, or bolt, the ring may be firmly tightened about the roller; still, also in this case the spike 11 may be used as at $11^x$ in Fig. 2. The ring may also have a few internal lugs 15 placed in cavities 16 in the roller, to prevent rotation of the ring; when such lugs are used the spike may or may not be omitted.

To make sure that each segment will stay firmly in its place the front terminal of each eye 7 is let partly into a notch 17 in the front edge of the inner end of each tooth.

The teeth and their segments may be either drop-forged or cast from steel or malleable iron and will thus be inexpensive. And if a tooth or its segment gets broken or damaged it is an easy matter to remove it and replace it by a new one. The teeth and their segments may also be applied to rollers of ordinary harrows the original teeth of which have been either worn out or discarded as inferior or undesirable.

What I claim is:

1. In an earth working machine and journaled in a suitable frame, a series of rollers, a series of spaced rings encircling each roller, each ring composed of a series of segments adapted to fit the periphery of the roller and provided each with a harrow tooth and with an eye embracing the tooth of the next segment of the ring, and means for tightening said ring about the roller.

2. The structure specified in claim 1, said tightening means comprising a screw or bolt arranged to shorten or contract the ring.

3. The structure specified in claim 2 and auxiliary means positively engaging the ring with the roller.

4. The structure specified in claim 1, each of said teeth having near its segment a notch for the front terminal of the eye of the next segment to engage and be held against displacement in radial direction away from the roller.

In testimony whereof I affix my signature.

ALFRED L. JOHNSON.

Copies of this patent may be obtained for five cents each, by addressing the "Commissioner of Patents, Washington, D. C."